United States Patent
Chen et al.

(10) Patent No.: US 9,807,339 B2
(45) Date of Patent: Oct. 31, 2017

(54) FRAME RATE CONVERSION SYSTEM

(71) Applicant: Sharp Laboratories of America, Inc., Camas, WA (US)

(72) Inventors: Xu Chen, Vancouver, WA (US); Petrus J. L. Van Beek, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 14/737,781

(22) Filed: Jun. 12, 2015

(65) Prior Publication Data

US 2016/0366366 A1 Dec. 15, 2016

(51) Int. Cl.

| H04N 7/01 | (2006.01) |
|---|---|
| G06K 9/52 | (2006.01) |
| G06K 9/62 | (2006.01) |
| G06T 7/40 | (2017.01) |
| G06T 7/60 | (2017.01) |
| G06K 9/32 | (2006.01) |
| G06K 9/46 | (2006.01) |
| H04N 5/14 | (2006.01) |

(52) U.S. Cl.
CPC .......... *H04N 7/0127* (2013.01); *G06K 9/325* (2013.01); *G06K 9/52* (2013.01); *G06K 9/6215* (2013.01); *G06T 7/40* (2013.01); *G06T 7/60* (2013.01); *G06K 2009/4666* (2013.01); *G06T 2207/20024* (2013.01); *H04N 5/144* (2013.01)

(58) Field of Classification Search
CPC ...................................................... H04N 5/145
USPC ......................................... 348/459, 451–458
See application file for complete search history.

(56) References Cited

U.S. PATENT DOCUMENTS

| 4,330,833 | A | * | 5/1982 | Pratt ...................... H03H 17/02 348/607 |
|---|---|---|---|---|
| 5,978,514 | A | * | 11/1999 | Yamaguchi .......... H04N 19/503 375/240.11 |
| 8,446,524 | B2 | | 5/2013 | Chen et al. |
| 8,718,366 | B2 | | 5/2014 | Wredenhagen |
| 8,774,514 | B2 | * | 7/2014 | Kim ................... G06K 9/00456 382/171 |
| 8,896,776 | B2 | * | 11/2014 | Kimura ............. G02F 1/136213 349/38 |
| 2005/0078222 | A1 | | 4/2005 | Liu et al. |
| 2008/0232478 | A1 | * | 9/2008 | Teng ................ H04N 19/00939 375/240.27 |
| 2008/0284719 | A1 | * | 11/2008 | Yoshida ............ G02F 1/136277 345/102 |
| 2008/0284929 | A1 | * | 11/2008 | Kimura ............... G02F 1/13624 349/38 |

(Continued)

FOREIGN PATENT DOCUMENTS

JP 2002-281508 A 9/2002

OTHER PUBLICATIONS

Coates et al., Text Detection and Character Recognition in Scene Images with Unsupervised Feature Learning, ICDAR 2011, 6 pgs.

(Continued)

*Primary Examiner* — Paulos M Natnael
(74) *Attorney, Agent, or Firm* — Chernoff Vilhauer McClung & Stenzel, LLP (57) ABSTRACT

A system for the conversion of video from one frame rate to a different frame rate. The system includes the application of graphical element and text detection and processing in frame rate up conversion.

6 Claims, 11 Drawing Sheets

(56) References Cited

U.S. PATENT DOCUMENTS

| | | |
|---|---|---|
| 2009/0016618 A1 | 1/2009 | Zhou |
| 2009/0231314 A1 | 9/2009 | Hanaoka et al. |
| 2010/0315505 A1* | 12/2010 | Michalke .............. G06T 7/2046 348/118 |
| 2012/0177249 A1 | 7/2012 | Levy et al. |
| 2012/0182311 A1 | 7/2012 | Watanabe |
| 2012/0262543 A1* | 10/2012 | Lee ...................... H04N 13/026 348/43 |
| 2013/0100314 A1* | 4/2013 | Li ........................ H04N 5/2353 348/229.1 |
| 2013/0130843 A1* | 5/2013 | Burroughs ......... A63B 71/0686 473/415 |
| 2013/0194505 A1* | 8/2013 | Pahalawatta ............. H04N 5/21 348/607 |
| 2013/0223692 A1 | 8/2013 | Liu et al. |
| 2013/0229177 A1* | 9/2013 | Bammer .......... G01R 33/56341 324/309 |
| 2014/0153784 A1* | 6/2014 | Gandolph ............. G06T 7/0075 382/107 |
| 2014/0270504 A1* | 9/2014 | Baum ................ G06K 9/00744 382/165 |

OTHER PUBLICATIONS

Epshtein et al., Detecting Text in Natural Scenes with Stroke Width Transform, CVPR 2010, 8 pgs.

Ozay et al., Automatic TV Logo Detection and Classification in Broadcast Videos, European Signal Processing Conference 2009, 5 pgs.

Albiol et al., Detection of TV Commercials, ICASSP, 2004, 4 pgs.
Yan et al., Automatic video logo detection and removal, Multimedia Systems, vol. 10, No. 5, pp. 2005, 13 pgs.

International Search Report, dated Sep. 6, 2016, PCT International Application No. PCT/JP2016/002785, Sharp Kabushiki Kaisha, 8 pgs.

Satou et al., "An Efficient Method for Detecting Shot Boundaries and Telops in MPEG2 Video," IEICE Technical Report PRMU96, vol. 96, No. 385, dated Nov. 22, 1996, pp. 47-54.

* cited by examiner

FRAME RATE CONVERSION SYSTEM

CROSS-REFERENCE TO RELATED APPLICATIONS

None.

BACKGROUND OF THE INVENTION

For a digital video distribution system, the video is encoded and decoded using a series of video frames. Furthermore, in a digital video receiver device, such as an LCD TV, a series of video frames is decoded from the compressed video stream and further processed before final rendering on the display. Frame rate conversion (FRC) is a video processing method to convert the frame rate of a video stream, for example from 24 frames per second to 60 frames per second (fps), or from 60 fps to 120 fps. In frame rate conversion, new video frames are generated in addition to or in place of the input video frames, where the new frames may be rendered at time instances different from the time instances that the input frames are rendered. Frame rate conversion techniques may generate new video frames by combining adjacent video frames, for example by frame repetition or frame averaging. Higher video quality can be achieved by utilizing motion estimation and motion compensation techniques for frame rate conversion. This method is also known as motion-compensated frame interpolation. Motion estimation and motion compensation for frame rate conversion is conventionally carried out on a block by block basis.

Digital video content often contains textual and graphical elements that are overlaid onto or blended into the underlying camera-captured natural video frames. Digital video content, such as that available from over-the-air broadcast television, cable television, Internet based videos, etc., often presents a logo. For example, a television broadcast may include the broadcasting network and the broadcasting station logo in a lower right hand corner of the broadcast to indicate its source. In some situations, the broadcast has the logo image completely overlaying the underlying broadcast video content. In other situations, the broadcast logo image may be semi-transparent overlaying the underlying video content. The logo often remains in the video frames being displayed during all or a substantial portion of the program. In some cases, the logos include advertising content for the program. In addition, digital video content often contains text that is either static or moving with constant speed, such as movie credits, sliding or scrolling news updates, and other informational text and graphics. Broadcast channel logos, moving text, and similar graphical video elements represent a challenge for video frame rate conversion methods utilizing conventional motion estimation and motion compensation methods. Often, estimated motion vectors near the channel logo or moving text are not accurate. Hence, regions containing or near graphical and textual overlays in the motion compensated frames are likely to contain artifacts, may have temporal jitter and may appear temporally unstable.

The textual and graphical regions of the frames tend to be visually important to the viewing experience. The nature of the textual and graphical regions are typically included with an overlay on the underlying background video in a manner such that the textual and graphical regions have sharper edges than the background content. With the sharper edges and the visual importance of the textual and graphical regions any artifacts as a result of motion estimation and motion compensation of such regions tend to be readily noticeable by the viewer. Unfortunately, the traditional motion estimation and motion compensation techniques tend to result in inferior results.

The foregoing and other objectives, features, and advantages of the invention may be more readily understood upon consideration of the following detailed description of the invention, taken in conjunction with the accompanying drawings.

DETAILED DESCRIPTION OF PREFERRED EMBODIMENT

Figure 1:
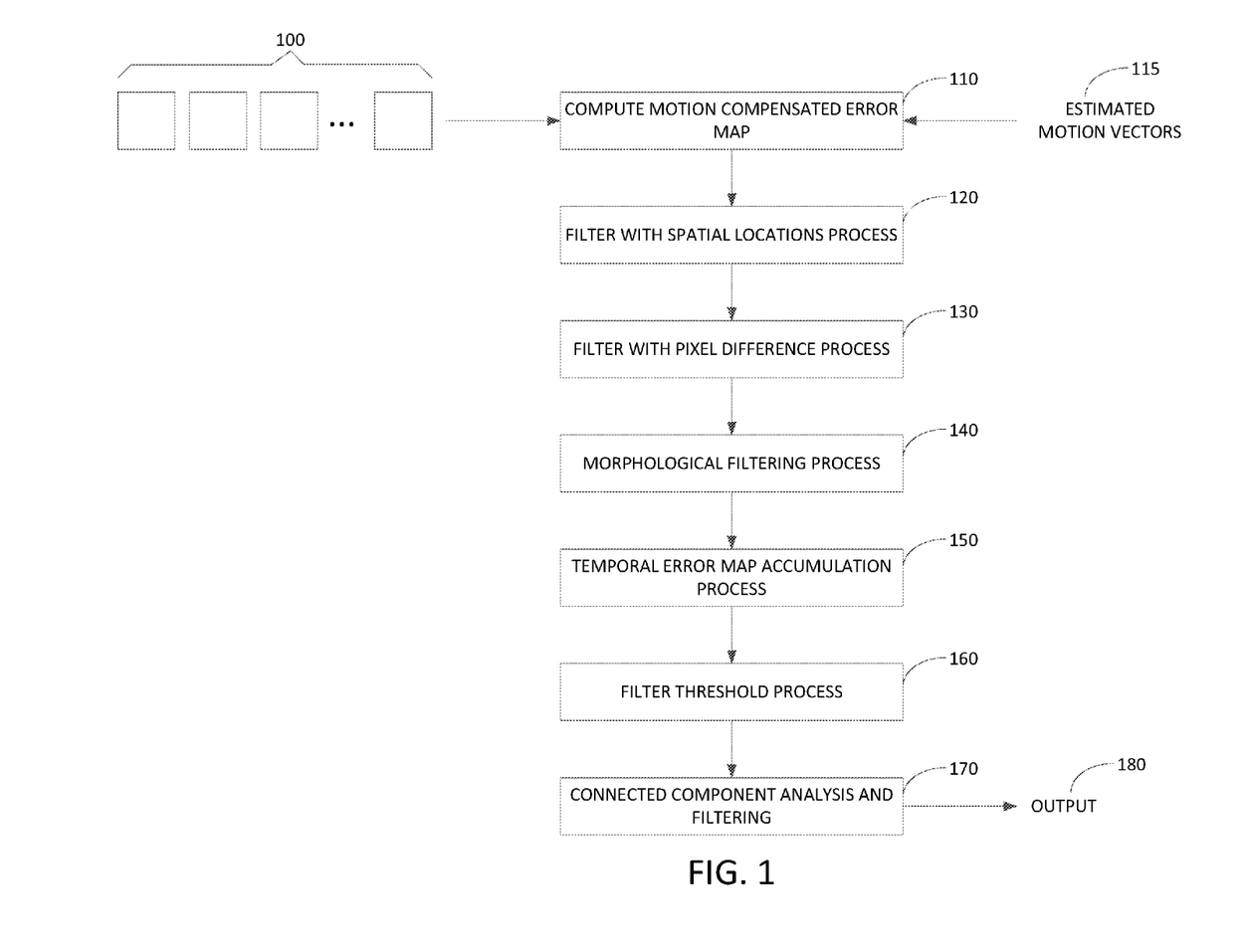
FIG. 1 illustrates an exemplary technique to detect logos within a series of frames.

Referring to FIG. 1, a video system for frame rate conversion may process a series of frames of the video in such a manner that particular generally static regions of the frames, such as logos, have a reduced amount of temporal jitter in the decoded sequence of frames. The temporal jitter and other artifacts result from the processing of the series of video frames that includes calculation of motion vectors to determine the motion within the frames. The logo regions of the series of frames of the video should have no motion vectors (or motion vectors with small values) associated with them because they are maintained at a consistent location within the series of frames. In order to reduce the amount of visual distortion associated with the logos it is desirable to have a particularized manner of compensating for the motion vectors.

The video system may modify a video that it receives as a series of input video frames 100. The series of input frames 100 represents one or more scenes of a video sequence, each temporally the same and/or different from each other. A motion compensated error map 110 is computed between frames of the video, such as temporally adjacent frames using estimated motion vectors 115 between the frames 100. The motion compensated error map 110 provides an initial mask of the logo graphics within the frames. In general, the results of the motion compensated error map 110 may be referred to as a likelihood map. This motion compensated error map 110 assists in the discrimination between a potential logo, which is typically a static region of the image, surrounded by (e.g., textured) background video. In many cases, the logo is overlaid on or blended with the background video content. When the background video content is textured and moving fast (e.g., significant motion vectors) the estimated motion vectors around the logo tend to correspond to the motion of the moving background and do not accurately represent the static logo. This results in large errors in the motion-compensated frame in the region of the logo. To distinguish the logo region from the background region, a threshold of the absolute value of the difference between the input frame and the motion compensated frame may be used. By way of example, the threshold value may be 20% of the maximum pixel value. That is, pixels with a motion compensated error larger than 20% are initially identified as likely belonging to a static logo area. In general, a logo may be a region of the image that is static in nature in its appearance, such as a graphical image and/or textual material.

Figure 2:
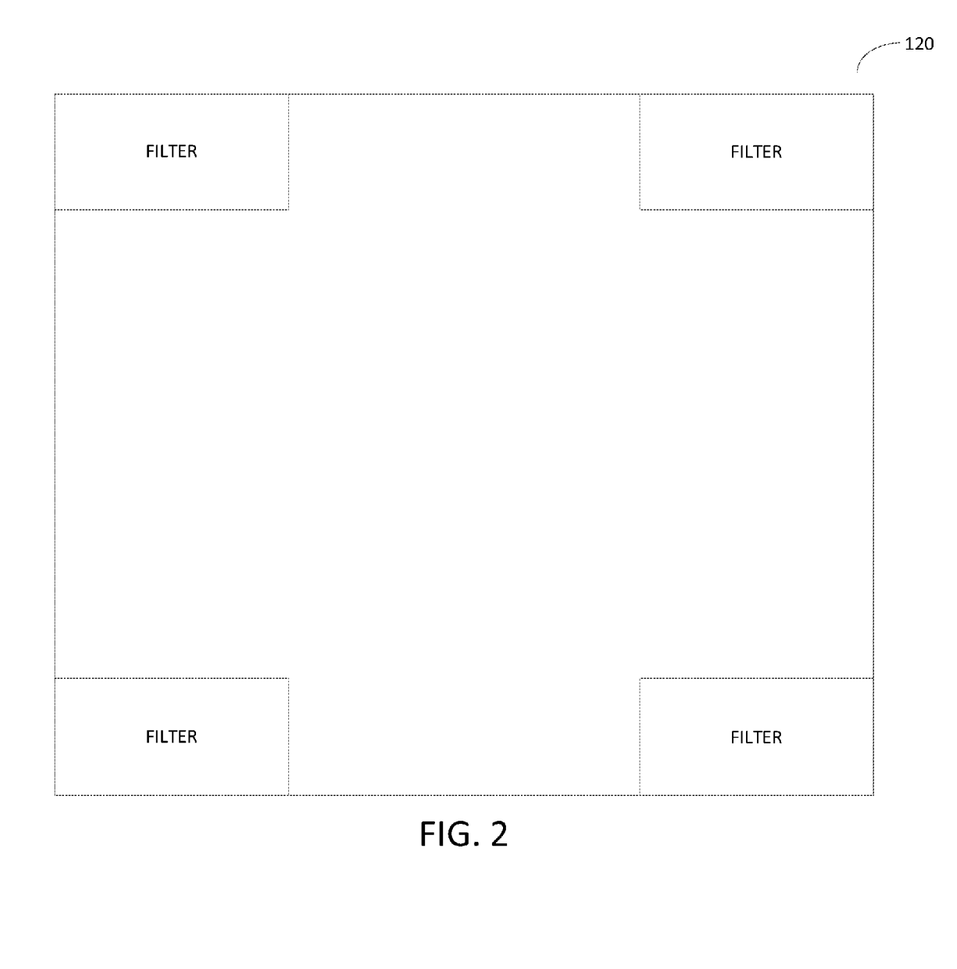
FIG. 2 illustrates a spatial filter.

The result of the motion compensated error map 110 tends to include a significant number of false positives, such as regions of the image that by the nature of the sequence of frames do not include logos. By way of example, this may occur as the result of an object or other item with complex motion in the generally central region of the video sequence. Video broadcasting systems tend to include logo regions toward one or more of the four corners of the frames in order to reduce impeding the viewer experience. In some cases, the logo regions tend to be toward one of the edges of the frame, including a central edge region. Accordingly, the results of the motion compensated error map 110 may be filtered using a filter with spatial locations 120. Referring also to FIG. 2, by way of example, the spatial locations may be generally the four corners of the image. In this manner potential logos outside the general four corner regions (or edge regions) are removed as candidates.

With the potential logos determined using a motion compensated error map 110, and subsequently filtered using a filter with spatial locations 120, it was determined that the logo image tends to be static over time in its location and that the logo image likewise tends be static in its pixel values over time. Accordingly, the direct non-motion-compensated, frame-to-frame pixel differences between temporally adjacent frames should ideally be zero or otherwise relatively small. A pixel difference filter 130 may be used to further reduce the number of false positives. For example, pixel locations of one frame where the absolute pixel value difference between corresponding pixel values of subsequent frames are each larger than a threshold value may be removed from being a candidate logo. By way of example, a value of 5 on a scale from 0 to 255 may be used as a threshold.

With the motion compensated error map 110, the filter with spatial locations 120, and the pixel difference filtering 130, results in identified regions that tend to include holes or other non-continuous regions. In general, such regions tend to have the appearance of being blotchy. Accordingly, a morphological filtering 140 may be applied to fill at least part of the holes and thereby reduce the noise in the image.

With the resulting modifications as a result of the motion compensated error map 110, the filter with spatial locations 120, the pixel filtering 130, and the morphological filtering 140, the shape of the logo mask may be refined using the temporal characteristics of the logo mask for the frames of a sequence of frames using a temporal error map accumulation process 150. In this manner, since the logo does not tend to move between frames, its characteristics should be temporally uniform. By way of example, this may be calculated using time recursive filtering as follows:

$$S_i = \alpha S_{i-1} + (1-\alpha) E_i;$$

where $S_i$ represents the time averaged mask, $E_i$ represents the candidate mask before time averaging, i denotes the frame index, and $\alpha$ denotes a parameter controlling the strength of the temporal averaging. For example, $\alpha$ may be set to 0.9 or other high value to increase the strength of temporal averaging, or may be set to a lower value to decrease the strength of temporal averaging.

The output pixel values of the temporal accumulation process are binarized by a threshold process 160 to detect areas that are likely to correspond to logo graphics. For example, this process may include pixel-wise thresholding, where an example value of the detection threshold is 0.2 in the range of [0, 1].

A filter based on connected component analysis and filtering 170 may be used to reduce the noise from the process. In general, a typical logo has a size that is generally within a defined range, such as larger than $X_l$ in width and/or smaller than $X_s$ in width, and/or smaller than $Y_s$ in height and/or larger than $Y_l$ in height. A filter based upon the anticipated size of the logo by using a threshold may be used to further discriminate those regions that are identified as less likely to be a logo. Accordingly, those regions that are sufficiently small and/or sufficiently large in the width and/or height are identified as not likely being a logo. Other properties of connected components may also be used to remove unlikely candidate regions, such as their aspect ratio, moments, or boundary shape. The output 180 of the logo detection is a detected binary logo mask identifying the logo region(s).

In an alternative embodiment, one or more of the different processes may be combined together into a single process. In an alternative embodiment, one or more of the different processes may be performed in a different order. In an alternative embodiment, one or more of the different processes may be omitted. In an alternative embodiment, one or more additional processes may be added. It is to be understood that the threshold values may be fixed and/or variable. It is to be understood that the processes may be based upon a pixel based process and/or a region based process.

The detected binary logo mask identifying the logo regions may be used together with a frame rate up conversion process to provide an improved picture quality in frame rate up conversion. Typically the frame rate conversion results in an increase in the frame rate, although it is likewise useful in a decrease in the frame rate.

Figure 3:
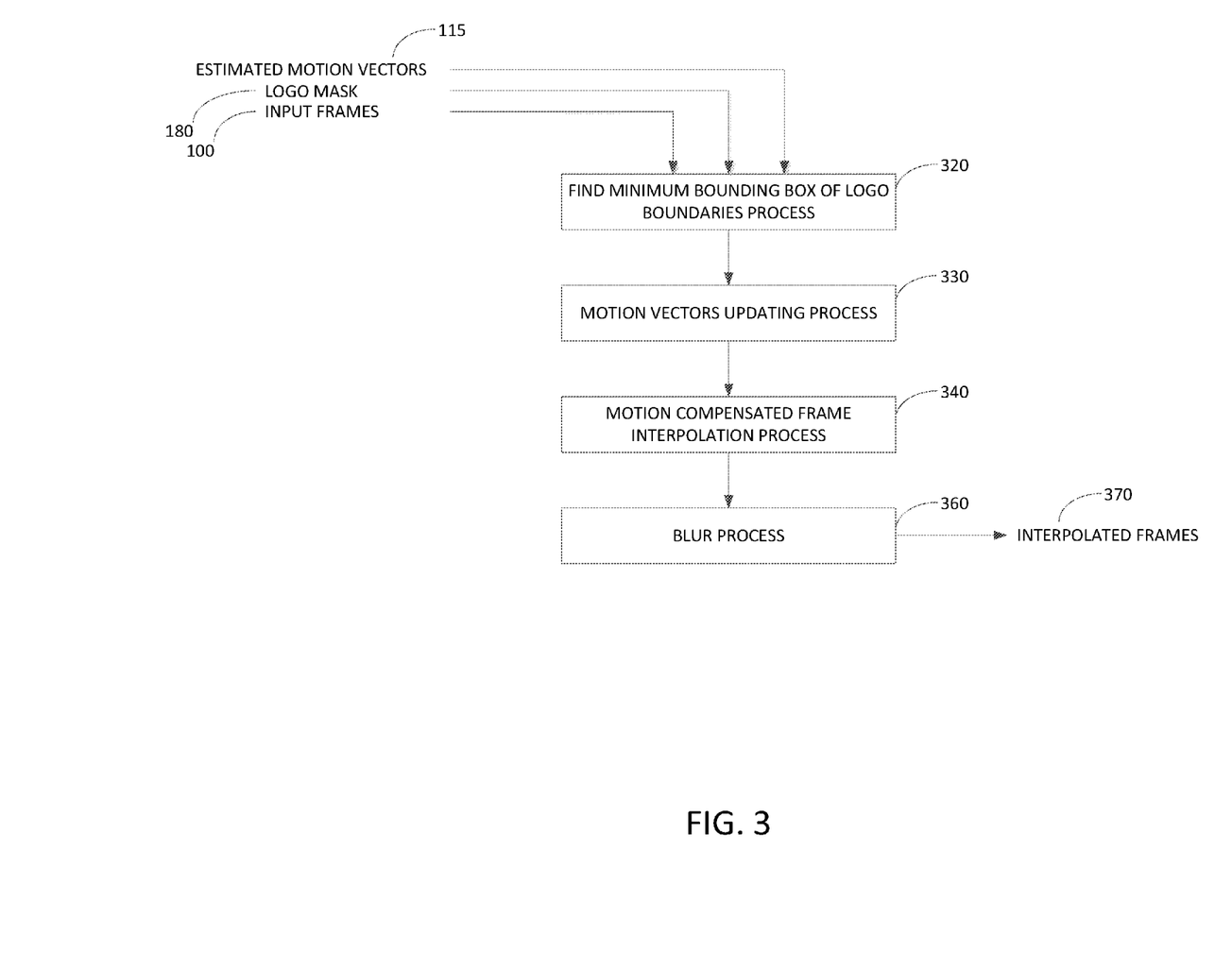
FIG. 3 illustrates a processing technique for a detected logo in frame rate up conversion.

Referring to FIG. 3, the detected binary logo mask 180 identifying the logo region(s) may be used in combination with a frame rate conversion process. The frame rate conversion process may receive the detected binary logo mask 180, the input frames 100, and the estimated motion vectors 115 of the input frame.

The system may estimate the region where the motion vectors should be updated by finding a minimum bounding box 320 covering the thresholded error map (within the area corresponding to the detected channel logo). The minimum bounding box 320 identifies potentially significant errors in the current output frame that should be updated.

Based upon the minimum bounding box 320, the estimated motion vectors 115 may be updated 330 by setting the motion vectors to be zero (or otherwise an insignificant value) for the pixels in the minimum bounding box 320.

Based upon the motion vectors updating 330, a motion compensated frame interpolation process 340 may be performed to determine interpolated frames, or otherwise, in order to change the frame rate. For example, regions identified to be a logo region may be computed by an averaging process of the pixel values in adjacent frames. In this manner, whatever process is used for the frame rate conversion will not apply the motion vector processing to the logo regions in the same manner because the motion vectors are set to zero (or a small number).

In order to improve the visual quality of the images, the pixels around the logo may be identified and filtered with a blur process 360 to reduce discontinuities associated with the bounding box processing. For example, the pixel area around the logo may be filtered using a median filter. The result of the blur process 360 is a set of interpolated frames 370.

Figure 4A:
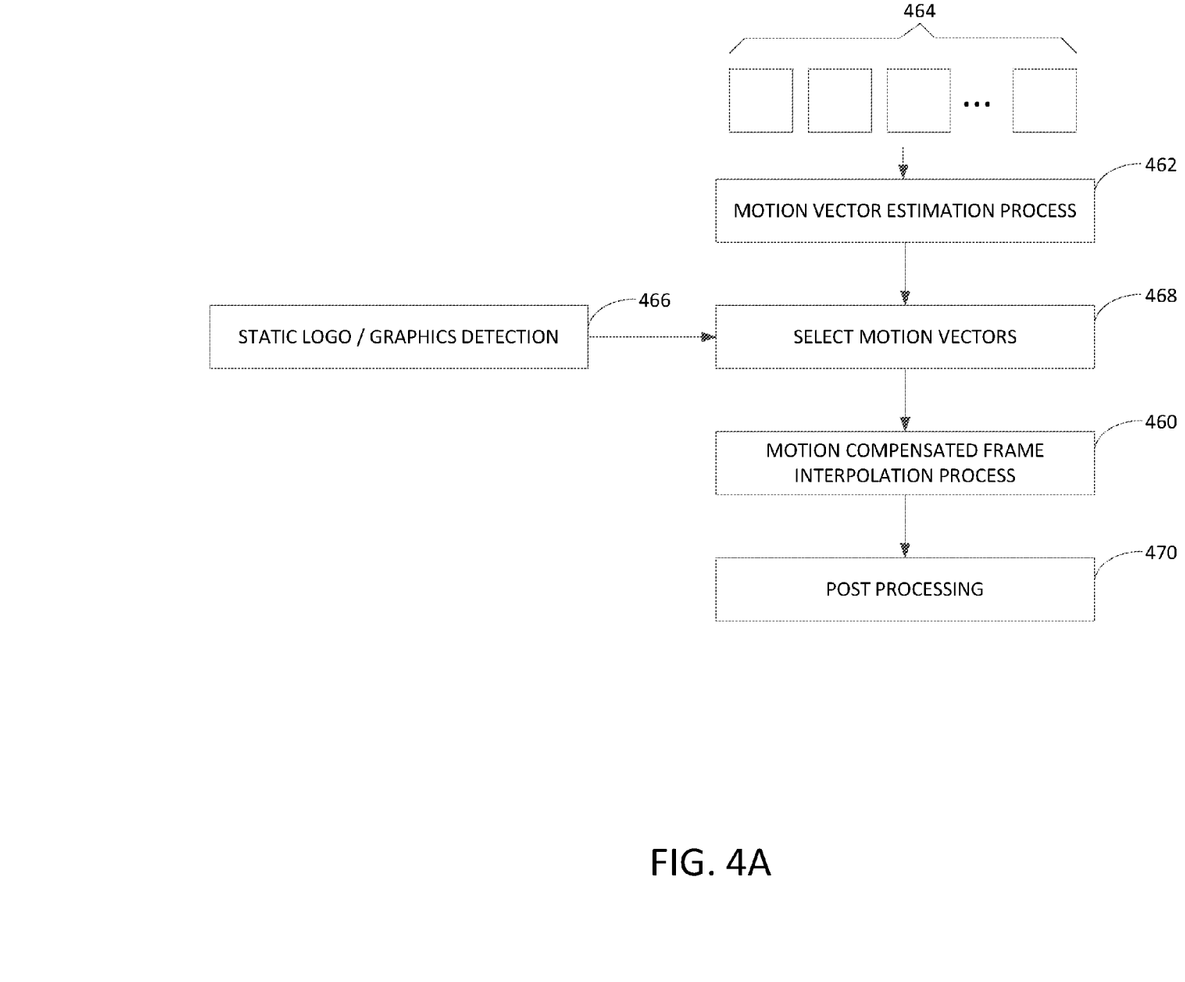
FIGS. 4A-4C illustrate modified frame rate conversion techniques.

FIG. 4A illustrates an overview of a modified framework for frame rate conversion (FRC) with text detection. The framework includes a motion compensated frame interpolation process 460, as well as a motion vector estimation process 462 that determines motion vectors from input frames 464. A static logo/graphics detection process 466 provides information identifying textual regions for a modified processing of the text areas, in particular, an alternative selection of motion vectors 468 to be used for the textual regions. The result of the motion compensated frame interpolation process 460 may include post processing 470.

Unfortunately increasing amount of video content features high contrast text that is moving with relatively constant speed generally in the form of a "logo", albeit a moving "logo". For example, a news broadcast may include the name lists of actors, and a sports broadcast may have a streaming ticker indicating up-to-date scores along with actual game footage. The moving text is often overlaid on the background video, possibly along with other graphics. When video images containing moving text require frame rate conversion (FRC), the text tends to become broken or distorted. Such distortions are highly visible to the viewer as the moving text overlay usually has a high contrast relative to the background. At the same time, it is perceptually important to process moving text in a suitable manner during FRC since the associated high contrast edges can readily create motion jitter without FRC. Hence, if FRC is used to process video that contains moving text, the FRC function should accurately identify and process the moving text. Therefore, moving text should be processed differently than the background video, but first the text needs to be identified in the frame.

Text detection that relies solely on edge detection tends to generate some false positives when the background is cluttered and has similar types of edges as the text. Text detection based on stroke width transform has limited success on broadcast video frames due to the video noise and cluttered background. Text detection using machine learning based approaches are usually computationally expensive and not suitable for real time processing. A text detection based technique using combined corner and edge features results in a robust and accurate text detection mask.

Figure 4B:
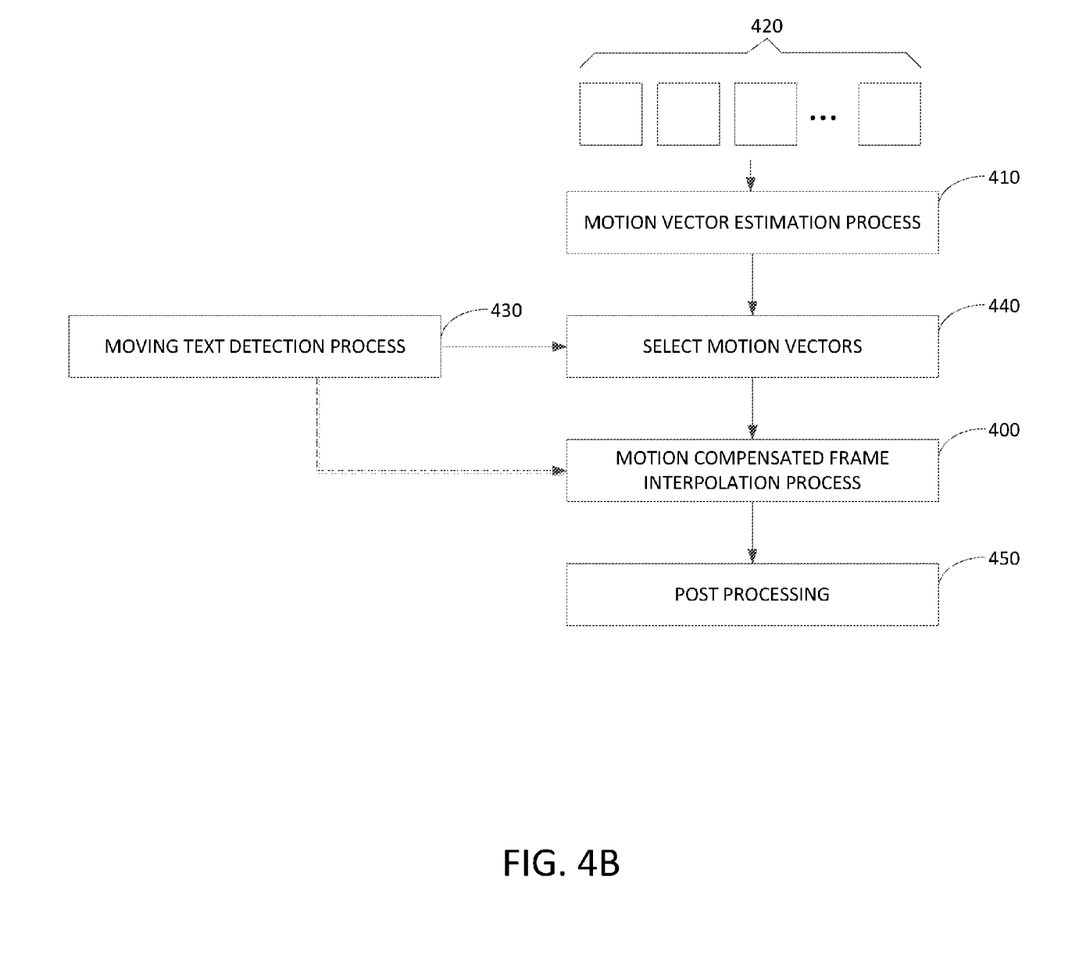

FIG. 4B illustrates an overview of a modified framework for frame rate conversion (FRC) with text detection. The framework includes a motion compensated frame interpolation process 400, as well as a motion vector estimation process 410 that determines motion vectors from input frames 420. A moving text detection process 430 provides information identifying textual regions and their moving speed for a modified processing of the text areas, in particular, an alternative selection of motion vectors 440 to be used for the textual regions. In addition, the motion compensated frame interpolation process 400 may use the output of the moving text detection process 430 to reduce the resulting occlusions in the video. The result of the motion compensated frame interpolation process 400 may be processed further in post processing stage 450.

Figure 5:
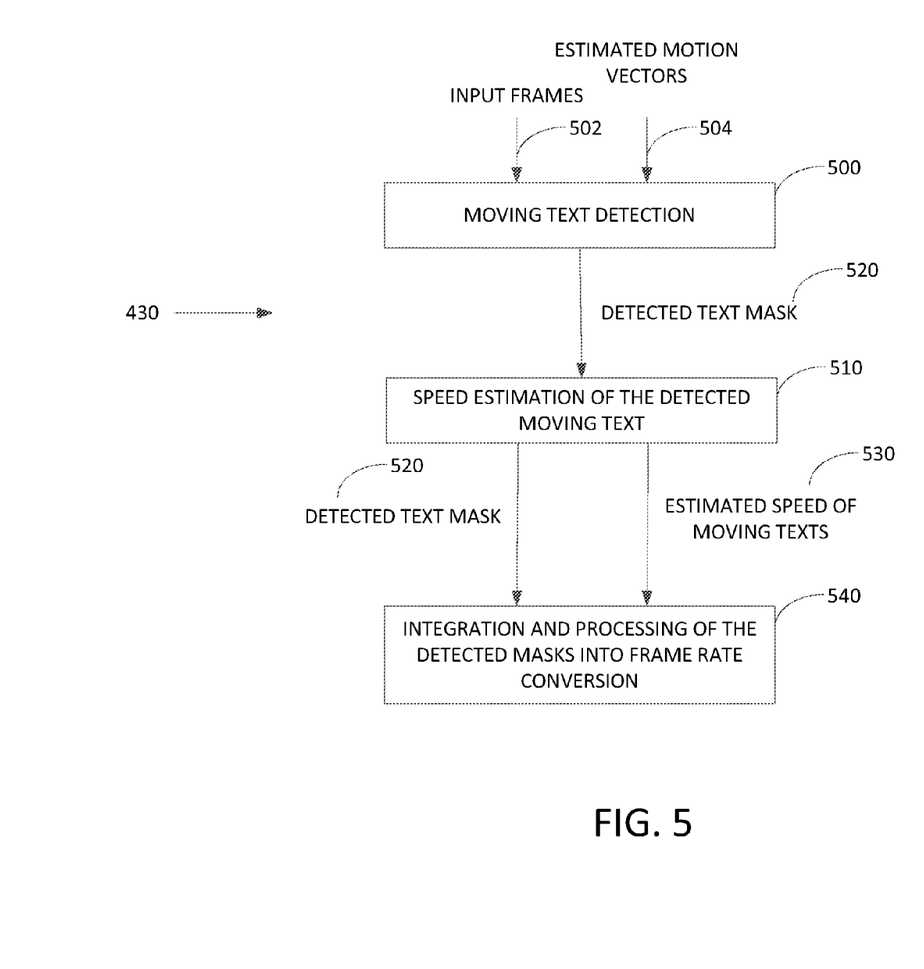
FIG. 5 illustrates additional details on processing of detected moving text masks in frame rate up conversion.

An exemplary moving text detection process 430 is illustrated in FIG. 5. The moving text detection process 430 may detect the moving texts 500 from the input frames 502 and motion vectors 504 estimated by conventional motion estimation methods or encoded within the video sequence of frames. The result of the moving text detection of each input frame is a corresponding detected text mask 520. Subsequently, the text detection process 430 may estimate the text speed 510 relying on feature matching between frames based upon the series of detected text masks 520. Then, the detected text mask 520 from the moving text detection 500 and the estimated speed of the moving text 530 from the speed estimation of the detected moving text 510 are used in the main frame rate conversion stage 540 in order to enhance the picture quality of the FRC results. The frame rate conversion stage may process those regions corresponding to the detected text mask 520 in a manner different from the other regions of the image. The frame rate conversion stage may include motion compensated interpolation of video frames.

Figure 6:
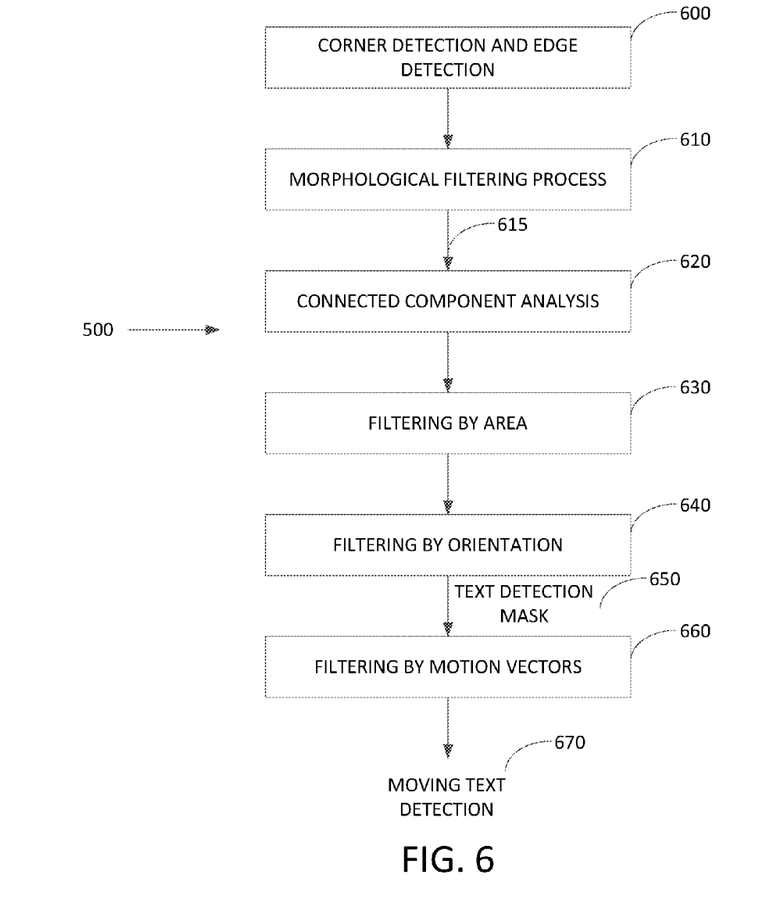
FIG. 6 illustrates a more detailed process for moving text detection.

As illustrated in the FIG. 6, the moving text detection process 500 may use a corner detection and edge detection stage 600. By way of example, a Harris corner detection filter may be used, and a Sobel or Canny edge detection filter may be used. One reason to use a corner feature is that there exist dense and orderly presences of corner points in graphical characters, especially in text and captions. Within the text the detected corners still have some distance between each other and therefore do not tend to provide a connected mask of the text. To provide a more connected mask, a morphological filtering process 610 may be applied to connect the detected corners into more connected text blobs to provide initial text detection masks 615. As some of the texts do not have strong corners, only applying corner detection may have two limitations: (1) it is likely to result in either miss detection in texts, and (2) in order to connect the corners into connected regions, large size morphological filtering structure elements have to be used which potentially generate over-detected text masks. In order to reduce such over-detection, edge features may also be used to facilitate the process of refining the shapes of corner-based detection. Therefore the size of the morphological filtering structure element may be reduced in order to make the text mask more accurate. For example, a Sobel edge detection may be used. The combination of corner and edge features can be realized by computing the union of one or more binary masks.

Once the system determines the initial text detection masks 615, a connected component analysis 620 may be applied in order to reduce the number of false positives. The output of the connected component analysis 620 may be filtered using a filtering by area filter 630, such as based upon a detected area being smaller than a threshold and/or larger than a threshold. The filtering based upon the area tends to remove isolated non-text regions since the moving text in the video frames are typically relatively close to one another. The output of the filtering by area 630 may be filtered using a filtering by orientation 640 to determine whether the area has a generally horizontal orientation and/or a generally vertical orientation. In many situations, it is desirable to eliminate those regions that are generally vertical in nature, especially for the horizontal edge region of the image. In many situations, it is desirable to eliminate those regions that are generally horizontal in nature, especially for the vertical edge region of the image. In other cases, it is desirable to ensure the textual region has a sufficiently large width, which may also be compared with a sufficiently small height, or a ratio thereof. In other cases, it is desirable to ensure the textual region has a sufficient large height, which may also be compared with a sufficiently small width, or a ratio thereof. The output of the filters 630, 640 may be a text detection mask 650. The text regions with significant motion vectors are identified using a filtering by motion vectors 660 to obtain masks for moving text detection 670.

Figure 7:
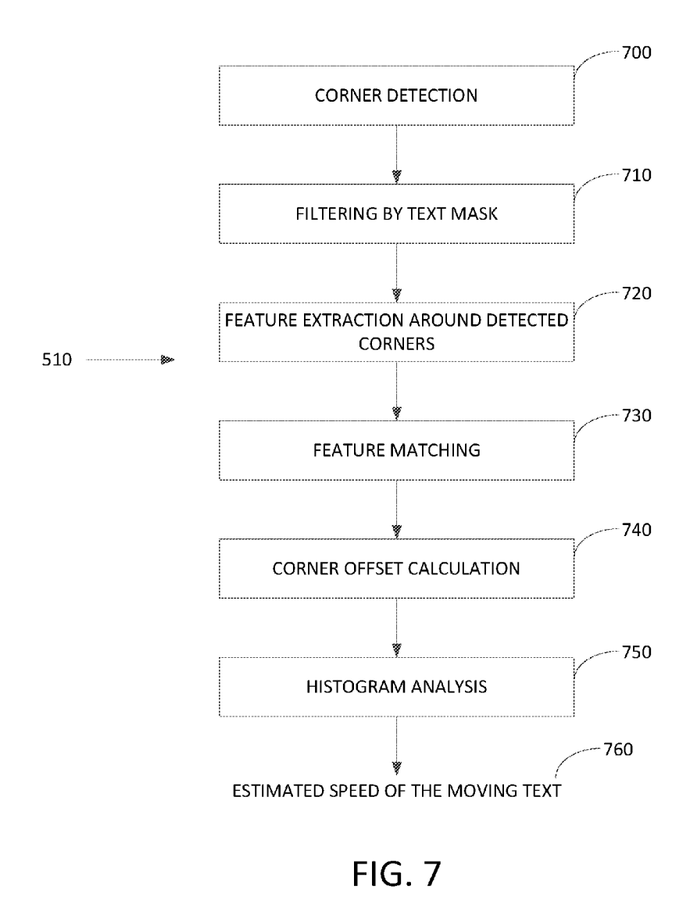
FIG. 7 illustrates a speed estimation of the detected moving text of FIG. 4.
Figure 8:
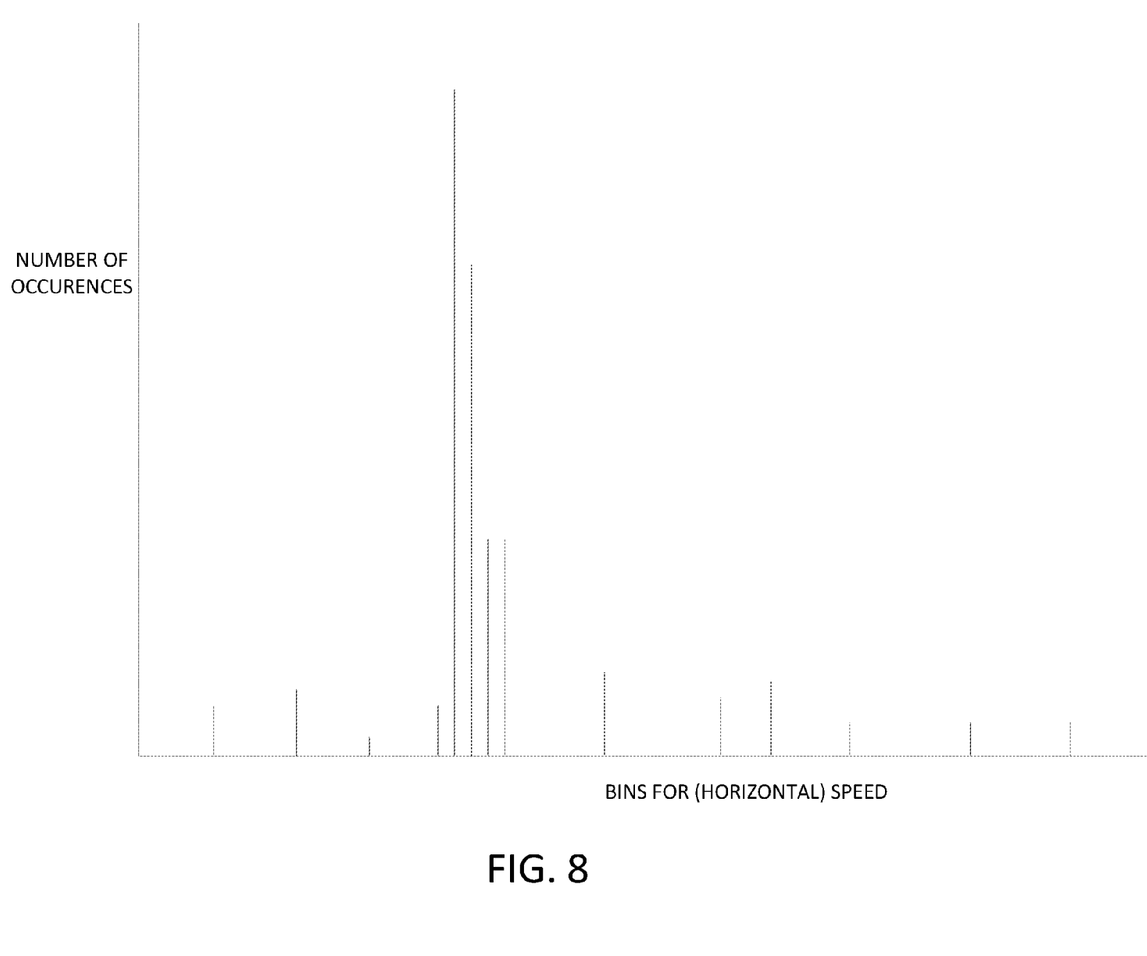
FIG. 8 illustrates a histogram of patches for feature matching.

Referring to FIG. 7, given the moving text detection 670 as a result of the process illustrated in FIG. 6, the system may estimate the motion vectors between the text regions, namely the speed of the moving texts 510. Since the motion estimation for the pixels at the borders of the moving text and the background is usually inaccurate, doing histogram analysis directly on the motion vectors calculated by conventional block-based motion estimation techniques may often not be sufficient for accurate speed estimation. A robust key point feature matching based process may be used to increase the accuracy of the speed estimation. In order to reduce the computational complexity, it is desirable to use simple pixel features for feature matching. In particular, it is preferred to use direct pixel intensity values in a patch or block of pixels. The speed estimation of the detected moving text 510 may use corner detection 700, previously calculated by corner and edge detection 600, for key point matching. In other words, key points such as corner points in one frame are matched to key points in another frame. The corner detection 700 is filtered by the text mask 710. Preferably, an edge detection is not also used. In this manner, the system may reduce the false matches from the background to the background and from the background to the text and focus on the matches between text regions in the adjacent frames. Subsequently, neighbor pixels within a certain patch size around the detected corners are extracted 720 and formulated as feature vectors for matching 730. An example of the patch size may be 15×15. The desired feature matching may be identified by computing the distance between pair-wise feature vectors and select the minimum distance from all the matches. From all the matched features, the system may select the top k best matches (with minimum feature distances) and calculate the differences of the coordinates of the matched feature points as a corner offset calculation 740. The system may then perform a histogram analysis 750 on the differences of the coordinates for the speed estimation. The bin of the histogram with the peak may be selected as an estimated speed of moving text 760. Other known robust statistical estimation techniques may be used including calculating the median, mode, trimmed mean, etc. Referring to FIG. 8, an exemplary histogram plot is illustration for speed estimation using intensity based feature matching in the horizontal direction with the top 100 matches.

Figure 9:
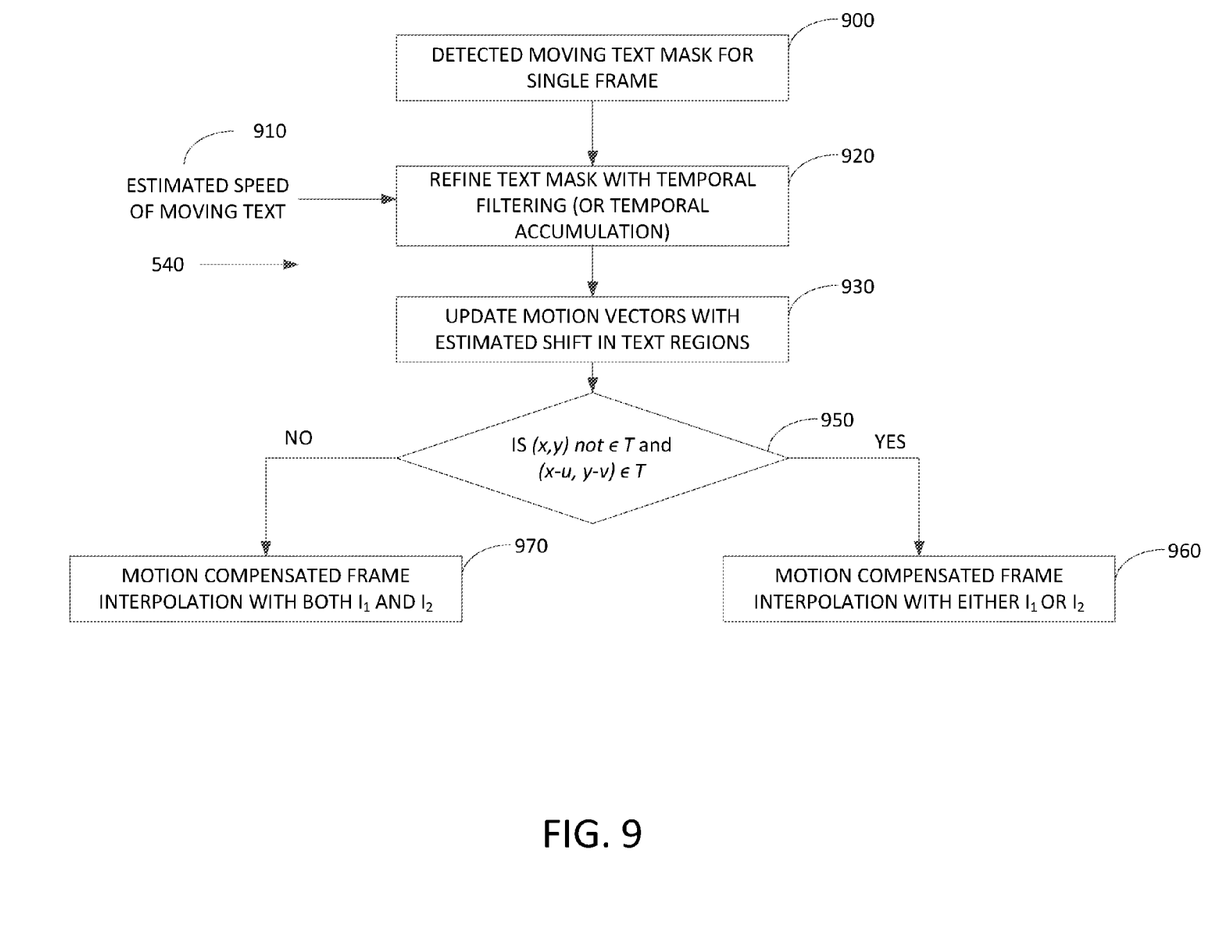
FIG. 9 illustrates an integration and processing of the detected masks into frame rate conversion of FIG. 5.

The moving text detection 500 (FIG. 6) together with the estimated speed of the moving text 510 (FIG. 7) may be used together with a system for integrating and processing of the detected masks into frame rate conversion 540 (FIG. 5). Referring to FIG. 9, based on the single frame detection mask 900 together with the estimated motion vectors 910 of the text regions of that frame, the system refines the text mask using temporal information 920 for a more temporally smooth movement. Based on the single frame detection mask and the estimated MV of the text regions, the system may refine the text mask using temporal consistency. One technique to refine the mask temporally is to take the union of the binary mask of the kth frame and the shifted/warped binary mask of the (k+1)th frame where the shift/warping amount is determined based upon the estimated text speed. For example, one technique to temporally refine the mask is to take the union of the binary mask of the kth frame and the shifted binary mask of the (k+1)th frame where the shift amount is determined by the estimated text speed. Once the text mask is refined, the motion vectors calculated by conventional pixel-based or block-based techniques are updated 930 with the estimated moving text speed in textual regions. The motion compensation technique may be applied using the updated motion vectors field in the main frame rate conversion stage 950. In the process of motion compensated frame interpolation, if a pixel belongs to the textual regions in $I_1$ and belongs to the background regions in $I_2$, or vice versa, the corresponding pixel in the interpolated frame will be calculated using only the information from either $I_1$ or $I_2$ where $I_1$ and $I_2$ are adjacent frames 960. Such pixels correspond to occlusions with covered or uncovered areas. In particular, assume the speeds estimated for textual regions between adjacent frames is (u,v), the text mask in $I_1$ as T and the rest of the background regions in $I_1$ as B. For any pixel (x,y), if (x,y) $\notin$ T and (x−u, y−v)$\in$T, the interpolation should be conducted using only the information from $I_1$. Otherwise, the motion compensated frame is based upon the interpolation of both $I_1$ and $I_2$ 970.

Figure 4C:
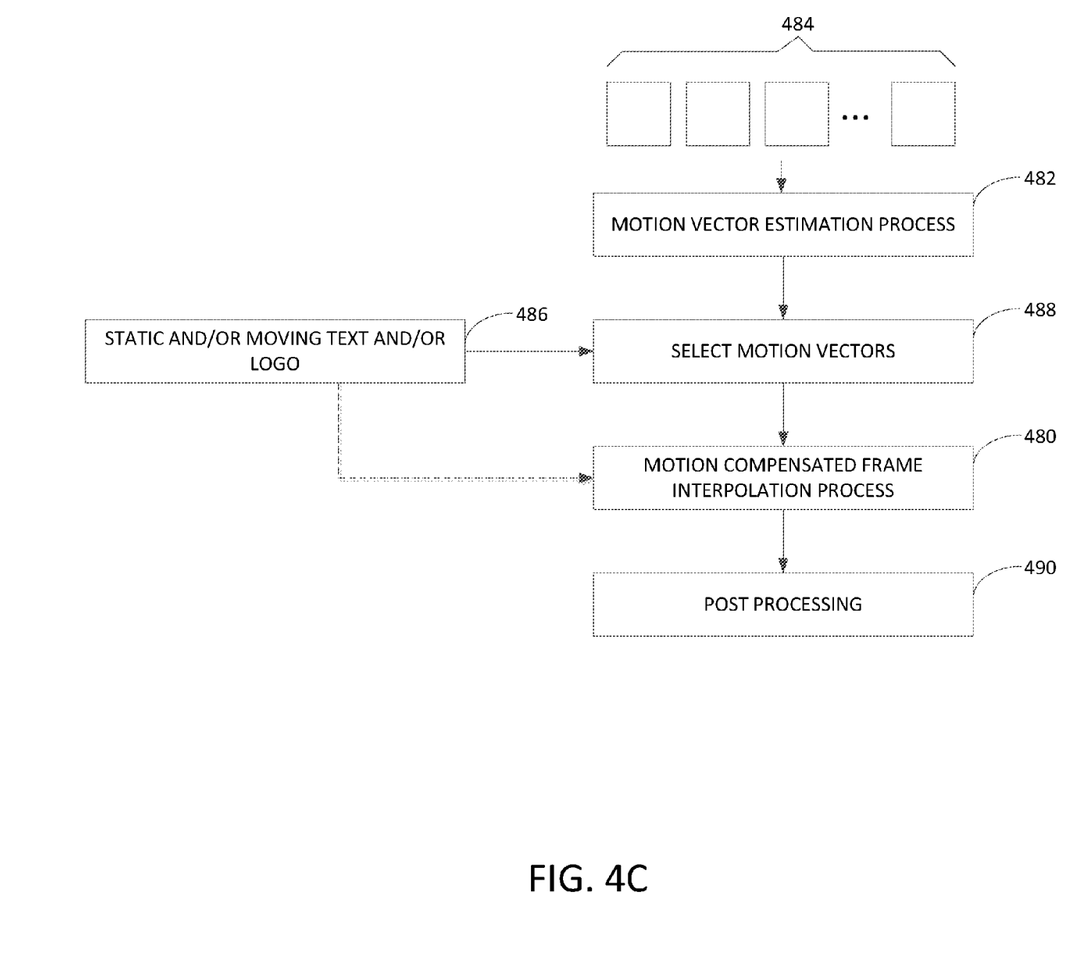

FIG. 4C illustrates an overview of a modified framework for frame rate conversion (FRC) with text detection. The framework includes a motion compensated frame interpolation process 480, as well as a motion vector estimation process 482 that determines motion vectors from input frames 484. A static and/or moving text and/or logo detection process 486 provides information identifying textual and graphical regions for a modified processing of these areas, in particular, an alternative selection of motion vectors 488 to be used for the textual and graphical regions. In addition, the motion compensated frame interpolation process 480 may use the output of the static and/or moving text and/or logo detection process 486 to reduce artifacts in the video. The result of the motion compensated frame interpolation process 480 may include post processing 490.

The terms and expressions which have been employed in the foregoing specification are used in as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A system for detecting a graphical element in a selected image of a series of images comprising:
   (a) a motion compensated error map process that identifies regions of said selected image that have a value greater than a threshold of the difference between said selected image and a motion compensated said selected image based upon said series of images to provide a likelihood map for detecting said graphical element;
   (b) a first filter process based upon said selected image and a plurality of said series of images other than said selected image to temporally smooth said likelihood map;
   (c) said system modifying said likelihood map based upon said first filter process,
   (d) further comprising a second filter process to filter out spatial locations of said likelihood map at spatial locations that are generally central in said selected image, a third filter process to filter out spatial locations of said likelihood map where a difference between said selected image and a non-motion compensated said one of said series of images other than said selected image is greater than a threshold, a fourth filter process to spatially smooth said likelihood map, a fifth filter process to filter out regions having a size less than a first threshold and greater than a second threshold and modifying said likelihood map based upon said first second, third, fourth, and fifth processes.

2. The system of claim 1 wherein said likelihood map is provided to said first filter process which provides a first modified likelihood map.

3. The system of claim 2 wherein said first filter process provides said first modified likelihood map to said second filter process which provides a second modified likelihood map.

4. The system of claim 3 wherein said second filter process provides said second modified likelihood map to said third filter process which provides a third modified likelihood map.

5. The system of claim 4 wherein said third filter process provides said third modified likelihood map to said fourth filter process which provides a fourth modified likelihood map.

6. The system of claim 5 wherein said fourth filter process provides said fourth modified likelihood map to said fifth filter process which provides a fifth modified likelihood map.

* * * * *